United States Patent
Nishihata

(10) Patent No.: US 10,407,869 B2
(45) Date of Patent: Sep. 10, 2019

(54) CONSTRUCTION MACHINE PROVIDED WITH PREHEATING UNIT AND PREHEATING METHOD OF CONSTRUCTION MACHINE

(71) Applicant: Hitachi Construction Machinery Co., Ltd., Taito-ku, Tokyo (JP)

(72) Inventor: Jun Nishihata, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 108 days.

(21) Appl. No.: 15/555,799

(22) PCT Filed: May 26, 2015

(86) PCT No.: PCT/JP2015/065097
§ 371 (c)(1),
(2) Date: Sep. 5, 2017

(87) PCT Pub. No.: WO2016/189653
PCT Pub. Date: Dec. 1, 2016

(65) Prior Publication Data
US 2018/0038074 A1    Feb. 8, 2018

(51) Int. Cl.
*E02F 9/08* (2006.01)
*F16H 57/04* (2010.01)
(Continued)

(52) U.S. Cl.
CPC ............ *E02F 9/0866* (2013.01); *B60K 11/02* (2013.01); *B60K 11/04* (2013.01); *E02F 9/226* (2013.01);
(Continued)

(58) Field of Classification Search
CPC .................................. E02F 9/268; E02F 9/226
See application file for complete search history.

(56) References Cited

U.S. PATENT DOCUMENTS 5,709,085 A    1/1998 Herbig
6,354,089 B1    3/2002 Lech et al.
2010/0326067 A1    12/2010 Weiser et al.

FOREIGN PATENT DOCUMENTS

EP    2 108 813 A1    10/2009
EP    2108813 A1 * 10/2009    ............. F01P 7/165
(Continued)

OTHER PUBLICATIONS

International Search Report (PCT/ISA/210) issued in PCT Application No. PCT/JP2015/065097 dated Jul. 7, 2015 with English translation (Four (4) pages).
(Continued)

*Primary Examiner* — Abiy Teka
(74) *Attorney, Agent, or Firm* — Crowell & Moring LLP

(57) ABSTRACT

To provide a construction machine including a novel preheating unit that can efficiently preheat entire circulation channel where fluid flows, and a preheating method of the construction machine. A bypass channel is arranged in a circulation channel through which the fluid is circulated, this bypass channel is provided with the preheating unit that is formed of a heater and a bypass pump. According to such configuration, even in a state circulation of the fluid may stop in the circulation channel, the fluid can be heated while the fluid is circulated through the bypass channel, and therefore the entire circulation channel can be efficiently preheated. Moreover, since retrofitting to the existing circulation channel is possible, sound versatility can be exerted.

7 Claims, 5 Drawing Sheets

(51) Int. Cl.
  *B60K 11/02*   (2006.01)
  *F01M 5/00*    (2006.01)
  *F01P 3/20*    (2006.01)
  *F15B 21/042*  (2019.01)
  *B60K 11/04*   (2006.01)
  *F01M 1/16*    (2006.01)
  *F02D 41/06*   (2006.01)
  *F02N 19/04*   (2010.01)
  *F02N 19/10*   (2010.01)
  *E02F 9/22*    (2006.01)
  *E02F 9/26*    (2006.01)
  *E02F 3/32*    (2006.01)
  *F01M 5/02*    (2006.01)
  *E02F 9/20*    (2006.01)

(52) U.S. Cl.
  CPC ............... *E02F 9/268* (2013.01); *F01M 1/16* (2013.01); *F01M 5/001* (2013.01); *F01P 3/20* (2013.01); *F02D 41/064* (2013.01); *F02N 19/04* (2013.01); *F02N 19/10* (2013.01); *F15B 21/042* (2013.01); *F16H 57/04* (2013.01); *F16H 57/0412* (2013.01); *B60Y 2200/412* (2013.01); *E02F 3/32* (2013.01); *E02F 9/2066* (2013.01); *F01M 5/021* (2013.01); *F01P 2037/02* (2013.01); *F01P 2060/18* (2013.01)

(56) References Cited

FOREIGN PATENT DOCUMENTS

| JP | 58-137106 U   | 9/1983  |
|----|---------------|---------|
| JP | 8-284907 A    | 11/1986 |
| JP | 9-505131 A    | 5/1997  |
| JP | 2000-80679 A  | 3/2000  |
| JP | 2005-188434 A | 7/2005  |
| JP | 5271500 B2    | 8/2013  |
| JP | 5583150 B2    | 9/2014  |

OTHER PUBLICATIONS

Japanese-language Written Opinion (PCT/ISA/210) issued in PCT Application No. PCT/JP2015/065097 dated Jul. 7, 2015 (Four (4) pages).

* cited by examiner

CONSTRUCTION MACHINE PROVIDED WITH PREHEATING UNIT AND PREHEATING METHOD OF CONSTRUCTION MACHINE

TECHNICAL FIELD

The present invention relates to a construction machine provided with a preheating unit for preheating fluid such as the cooling water of a prime mover (an engine and an electric motor), a transmission oil, and a hydraulic oil, and a preheating method of the construction machine.

BACKGROUND ART

In a construction machine such as a hydraulic excavator, various kinds of fluid (liquid) is used such as the cooling water of a prime mover (an engine and an electric motor), a lubricating oil of a transmission (a transmission oil), and a hydraulic oil of an actuator. When such construction machine is used in an extremely cold region of −40° C. or below, for example, there is a case that, once the prime mover is stopped, such fluid is frozen, and restarting becomes hard. Also, when the prime mover is started in a state the lubricating oil such as the transmission oil is frozen and the lubricating performance thereof is lost, there is a risk of breakage of the transmission, hydraulic pump, actuator and the like.

As a technology for improving the engine starting performance under a cold condition, in PATENT LITERATURE 1 described below, for example, such technology is proposed that a heater is provided in the suction piping that connects a hydraulic pump and a hydraulic oil tank to each other, a hydraulic oil within the suction piping is warmed up before starting an engine, and thereby the starting performance of the engine is improved. Moreover, in PATENT LITERATURE 2 described below, such technology is proposed that preheaters are provided in an engine, a cab, and the like, and the engine, the cab, and the like are preheated by these preheaters. Further, in PATENT LITERATURE 3 described below, such technology is proposed that a hydraulic oil of the entire vehicle body is warmed by driving both of a main electric motor and an electric heater, the main electric motor driving the vehicle body.

CITATION LIST

Patent Literature

PATENT LITERATURE 1: JP-A No. Heisei 8-284907
PATENT LITERATURE 2: JP-A No. 2000-80679
PATENT LITERATURE 3: Japanese Patent No. 5271500

SUMMARY OF INVENTION

Technical Problem

In the meantime, in such preheating methods of the related arts as described above, there are such problems as described below. That is to say, according to the technology shown in PATENT LITERATURE 1 described above, since the hydraulic oil is warmed in a restricted area of only the suction piping, sufficient preheating is hard in an extremely cold region of −40° C. or below. In particular, in an electromotive type hydraulic excavator, a transmission for amplifying the pump rotational speed is arranged at a position for connecting a main electric motor and a pump to each other.

This transmission employs a forced circulation method that uses a pump operated by the electric motor of the transmission, and includes plural narrow pipes for directly supplying the lubricating oil to bearings and gears. Therefore, when the viscosity of the transmission oil becomes high and the mission oil is frozen in the inside of these narrow pipes and supply becomes insufficient or stops, there is a risk that defective lubrication occurs locally, and the bearings and the gears are seized and broken. Therefore, it is necessary to sufficiently preheat not only the suction piping of the hydraulic oil but also this transmission.

In contrast, since such technology as shown in PATENT LITERATURE 2 described above is a method of heating the cooling water of an engine by a combustion type heater, in a region of high elevation exceeding 2,000 m above the sea level, the oxygen concentration is low, and sound combustion is hard. Moreover, according to such technology as shown in PATENT LITERATURE 3 described above, there is a problem that, although the heating function is sufficient, when the main electric motor is stopped because of maintenance and the like, the main electric motor does not function.

Therefore, the present invention has been worked out for solving these problems, and its object is to provide a construction machine provided with a novel preheating unit that can efficiently preheat the entire circulation channel where fluid flows, and a preheating method of the construction machine.

Solution to Problem

In order to solve the problems described above, a first invention is a construction machine including a bypass channel in parallel with a circulation channel that circulates fluid, and a preheating unit that consists of a heater and a bypass pump in the middle of bypass channel. According to such configuration, even in a state circulation of the fluid may stop in the circulation channel, the fluid can be heated while the fluid is circulated through the bypass channel, and therefore the entire circulation channel can be efficiently preheated. Also, since retrofitting to an existing circulation channel is possible, sound versatility can be exerted.

A second invention is the construction machine of the first invention in which the bypass channel is arranged between an upstream side and a downstream side of a circulation pump that is arranged in the circulation channel, and the bypass pump of the preheating unit circulates the fluid in the direction same to that of the pump of the circulation channel. According to such configuration, even in a state the circulation pump may stop, the fluid can be heated while the fluid is positively circulated in the direction same to that of the pump of the circulation channel, and therefore the entire circulation channel can be efficiently preheated.

A third invention is the construction machine of the first invention in which the circulation channel is configured to circulate a lubricating oil between a hydraulic oil tank and a main pump, the bypass channel is arranged in the circulation channel that is provided between the hydraulic oil tank and the main pump, and the circulation channel and the bypass channel form a circulation loop of the hydraulic oil. According to such configuration, since a circulation channel of a small loop can be formed by the bypass channel in a circulation channel of a large loop that is formed between the hydraulic oil tank and the main pump, even in a state the main pump may stop, the hydraulic oil within the hydraulic oil tank can be circulated by a small heat quantity while being preheated through the bypass channel.

A fourth invention is the construction machine of the first or second invention in which the circulation channel is a circulation channel that circulates a transmission oil for a transmission. According to such configuration, even in a state the transmission and the circulation pump of the transmission may stop, the transmission oil can be heated while being positively circulated within the circulation channel of the transmission, and therefore the entire transmission can be efficiently preheated.

A fifth invention is the construction machine of the first to third invention in which the circulation channel is a circulation channel that circulates cooling water for a prime mover. According to such configuration, even in a state the prime mover such as an engine (internal combustion engine) and an electric motor and the circulation pump of the prime mover may stop, since the cooling water can be heated while being positively circulated within the circulation channel thereof, the entire engine can be efficiently preheated.

A sixth invention is the construction machine of the third invention in which the bypass channel connects the hydraulic oil tank and a suction tank to each other. According to such configuration, even in a state circulation of the hydraulic oil within the hydraulic oil tank may stop, while the hydraulic oil is positively circulated between the hydraulic oil tank and the suction tank, the entirety of them can be efficiently preheated.

A seventh invention is a preheating method with respect to the first to sixth invention in which an outside air temperature and temperature of the fluid when the prime mover is stopped are measured, heating of the fluid by the heater of the preheating unit and fluid circulation by the bypass pump are executed when the outside air temperature is lower than a first predetermined value T1 and the temperature of the fluid is lower than a second predetermined value T2 (where T1<T2), and only fluid circulation by the bypass pump of the preheating unit is executed when the outside air temperature is lower than the first predetermined value T1 and the temperature of the fluid is equal to or higher than the second predetermined value T2. According to such preheating method, since the fluid (oil kind) can be heated only when preheating is required, effective preheating without a loss can be effected.

Advantageous Effects of Invention

According to the present invention, even in a state the engine stops and circulation of the fluid such as the transmission oil stops in the circulation channel of the transmission and the like, the fluid can be heated through the bypass channel while being circulated, and therefore the entire circulation channel can be efficiently preheated. Moreover, since it is constructed so that the bypass channel is branched from the existing circulation channel and the preheating unit is attached to the bypass channel, the preheating unit can be easily retrofitted also to an existing construction machine. Further, since circulation and heating of the fluid by the preheating unit are finely controlled according to the change of the outside temperature, the oil temperature, and the like which occurs while the engine is stopped, efficient preheating processing can be effected while suppressing wasteful energy consumption.

DESCRIPTION OF EMBODIMENTS

Figure 1:
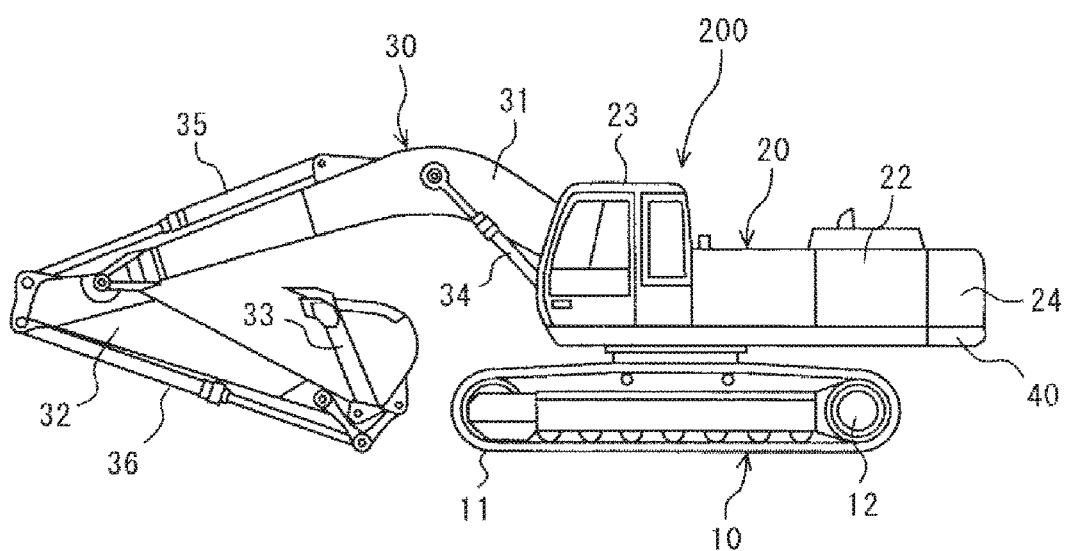
FIG. 1 is a vertical cross-sectional view that shows one embodiment of a construction machine (hydraulic excavator) 100 related to the present invention.

Next, an embodiment of the present invention will be explained referring to the attached drawings. FIG. 1 shows one embodiment of a hydraulic excavator 100 that is one of the construction machines related to the present invention. As shown in FIG. 1, this hydraulic excavator 100 is configured mainly of an undercarriage 10, and a revolving upperstructure 20 that is turnably arranged on the undercarriage 10. The undercarriage 10 includes a pair of crawlers 11 that are positioned in parallel with a travel base frame which is not illustrated in FIG. 1, and the crawler 11 is provided with a travel motor 12 of a hydraulic drive type that is for driving each crawler for traveling.

In contrast, the revolving upperstructure 20 is configured mainly of an engine chamber 22 that is installed on a revolving upperstructure frame 40, a cab 23 that is arranged on the front left side of this engine chamber 22, a front working mechanism 30 that extends forward from the right side of this cab 23, and a counterweight 24 that is arranged behind the engine chamber 22 so as to keep weight balance with this front working mechanism 30.

The front working mechanism 30 is configured mainly of a boom 31 that extends forward from the revolving upperstructure frame 40 side, an arm 32 that is swingably arranged at the distal end of this boom 31, and a bucket 33 that is swingably arranged at the distal end of this arm 32, and these boom 31, arm 32, and bucket 33 respectively operate by a boom cylinder 34, an arm cylinder 35, and a bucket cylinder 36 which respectively expand/shrink by the hydraulic pressure. Moreover, these boom cylinder 34, arm cylinder 35, bucket cylinder 36, travel motors 12, and the like are configured to operate by a pressure oil (hydraulic oil) that is supplied from a main pump 50 (FIG. 2) that is arranged within the engine chamber 22.

Figure 2:
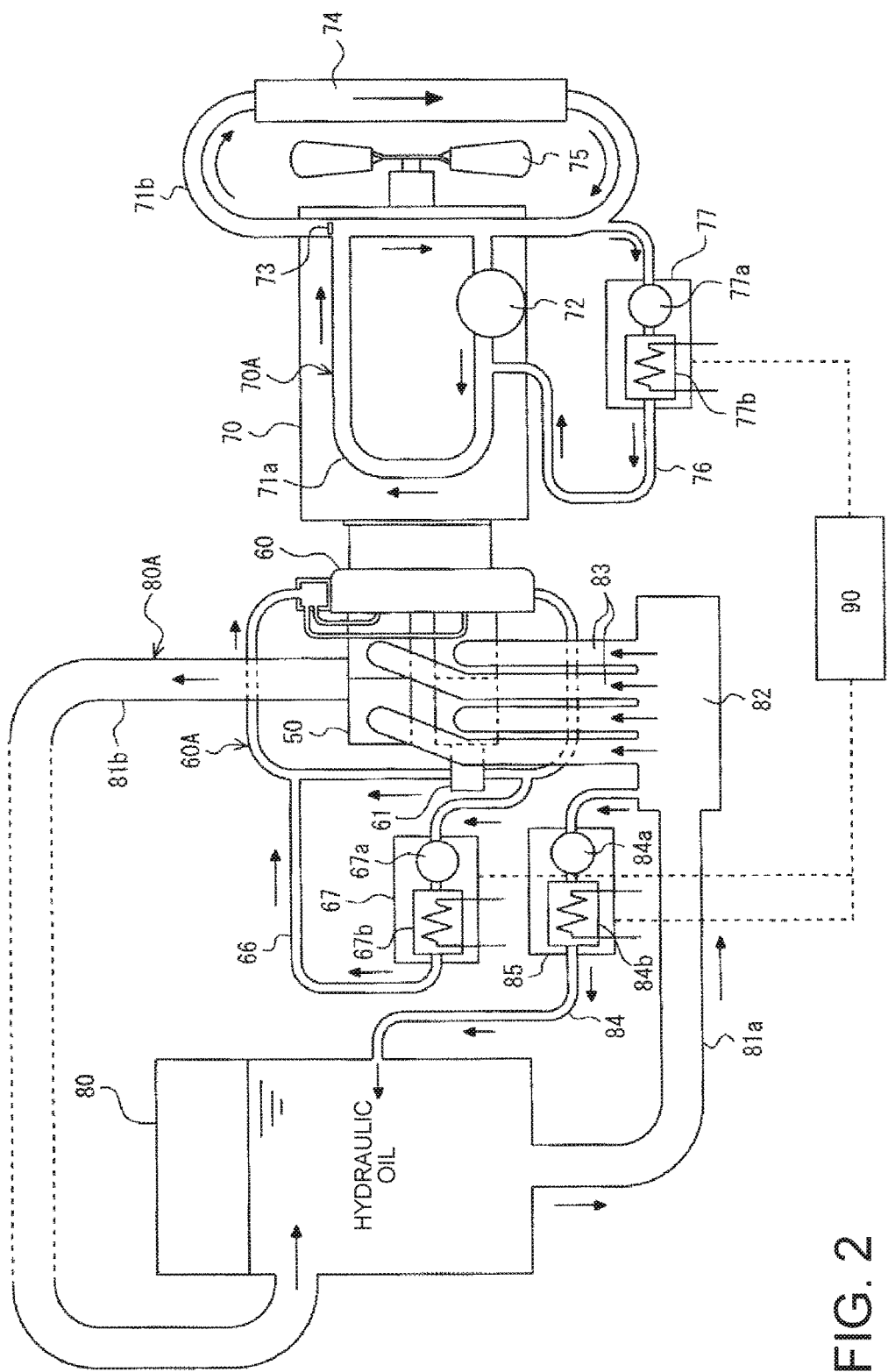
FIG. 2 is a schematic view that shows a configuration of the vicinity of a power train of the construction machine (hydraulic excavator) 100.

This main pump 50 is connected to an engine 70 through a transmission 60 as shown in FIG. 2, and is configured to suck the hydraulic oil within a hydraulic oil tank 80 through suction pipe 81a, a suction tank 82, and a suction pipe 83 by a drive force of the engine 70, and to feed the pressure oil to actuators of the boom cylinder 34, the arm cylinder 35, the bucket cylinder 36, the travel motors 12, and the like described above. This main pump 50 is arranged by plural numbers for one transmission 60, and it is configured that the hydraulic oil within the hydraulic oil tank 80 dividedly flows from the suction tank 82 to plural suction pipes 83, 83 . . . and is sucked by respective main pumps 50, 50 . . . .

Then, it is configured that the hydraulic oil of a high pressure discharged from the respective main pumps 50, 50 . . . is returned from the actuators described above to the hydraulic oil tank 80 through return pipe 81b. In other words, between this hydraulic oil tank 80 and the respective main pumps 50, 50 . . . , a circulation channel 80A of a large loop in one direction is formed by the suction pipe 81*a*, the suction tank 82, the suction pipes 83, and the return pipe 81*b*.

Figure 3:
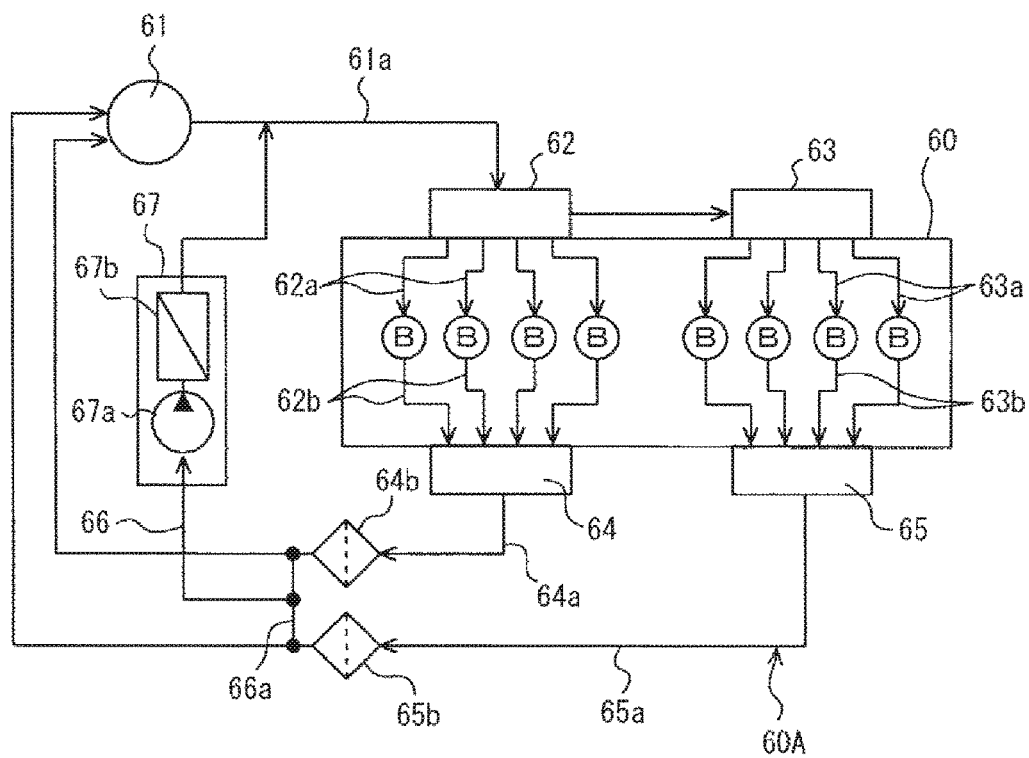
FIG. 3 is a schematic view that shows a configuration of a circulation channel 60A of a transmission 60.

The transmission 60 is a speed change gear that increases or reduces the speed of rotational drive of the engine 70 and transmits the rotational drive to the respective main pumps 50, 50 . . . by gears, and it is configured that the lubricating oil (transmission oil) is constantly supplied by a lubrication pump 61 when the transmission 60 is operated. FIG. 3 is a schematic view that shows a flow of the transmission oil in this transmission 60. As shown in FIG. 3, it is configured that the transmission oil sent out from the lubrication pump 61 flows dividedly to respective narrow pipes 62*a*, 62*a* . . . from a flow divide-cum-relay block 62 through an oil pipe 61*a*, and is supplied to respective bearings B, B . . . and gears to lubricate them. Furthermore, it is configured that a part of the oil having flown to this flow divide-cum-relay block 62 flows to a flow divide block 63 as it is, branches from this flow divide block 63 to respective narrow pipes 63*a*, 63*a* . . . , and is supplied to other respective bearings B, B . . . and gears to lubricate them.

Further, it is configured that the transmission oil having been supplied to the respective bearings B, B . . . and the gears flows to confluence blocks 64, 65 through the respective narrow pipes 62*b*, 62*b* . . . , 63*b*, 63*b* . . . to be merged, and returns to the lubrication pump 61 side through respective return oil pipes 64*a*, 65*a*. In other words, it is configured that the transmission oil circulates within a circulation channel 60A that is formed of the oil pipe 61*a*, the narrow pipes 62*a*, 62*a* . . . , 62*b*, 62*b* . . . , 63*a*, 63*a* . . . , 63*b*, 63*b* . . . , and the return oil pipes 64*a*, 65*a*. In addition, in the return oil pipes 64*a*, 65*a*, suction filters 64*b*, 65*b* are arranged respectively, and it is configured that, when a solid object such as iron powder is mixed into the transmission oil, the solid object is filtered and separated.

Also, a bypass pipe 66 is connected between the oil pipe 61 and the return oil pipes 64*a*, 65*a* in this circulation channel 60A so as to detour around the lubrication pump 61, and it is configured that the transmission oil flowing through the return oil pipes 64*a*, 65*a* and immediately after coming out of the suction filters 64*b*, 65*b* is drawn out through a connection pipe 66*a*, and is made flow directly to the oil pipe 61 in the same direction. Further, in this bypass pipe 66, a preheating unit 67 is arranged which integrates a bypass pump 67*a* and a heater 67*b* of an electro-thermal type, and it is configured that the transmission oil is drawn out to the bypass pipe 66 side by the bypass pump 67*a*, and that the transmission oil having been drawn out is heated by the heater 67*b* and is thereafter made flow to the oil pipe 61 side.

In contrast, as shown in FIG. 2, a circulation channel 70A through which the cooling water flows is formed in the engine 70 also. This circulation channel 70A is configured of a first circulation channel 71*a* that is formed within the engine 70, and a second circulation channel 71*b* that is formed between the engine 70 and a radiator. Also, it is configured that the cooling water is circulated within the engine 70 by a circulation pump 72 that is arranged in the first circulation channel 71*a*, when the temperature of the cooling water rises, a thermostat 73 works to make the first circulation channel 71*a* and the second circulation channel 71*b* communicate to each other to make the cooling water having become hot flow to the second circulation channel 71*b* side, and the cooling water is air-cooled by a radiator 74 and a cooling fan 75 and is returned to the first circulation channel 71*a* side.

Further, as shown in FIG. 2, similarly to the transmission 60 described above, a bypass pipe 76 and a preheating unit 77 are arranged also in the circulation channel 70A of this engine 70 so as to detour around the circulation pump 72, and it is configured that the cooling water that flows though this circulation channel 70A is drawn out, is heated, and is returned to the circulation channel 70A in the same direction. Furthermore, this preheating unit 77 is also configured of one that integrates a bypass pump 77*a* and a heater 77*b* of an electro-thermal type.

Moreover, as shown in FIG. 2, the hydraulic oil tank 80 and the suction tank 82 are also connected to each other in parallel with the suction pipe 81*a* by a bypass pipe 84 that includes a preheating unit 85, and it is configured that the hydraulic oil within the suction tank 82 is drawn out by a bypass pump 84*a* of the preheating unit 85, is heated by a heater 84*b* of an electro-thermal type, and is directly returned to the middle of the hydraulic oil tank 80. In other words, it is configured that a circulation channel of a small loop is formed in parallel with the circulation channel 80A of a large loop by this bypass pipe 84.

Moreover, operation of these respective preheating units 67, 77, 85 are automatically controlled by a controller (information processing equipment) 90. This controller 90 is configured to control these respective preheating units 67, 77, 85 based on input signals from various kind of sensors (oil temperature sensor, air temperature sensor) and an engine control unit (ECU) which are not illustrated in FIG. 2, and so on.

Figure 4:
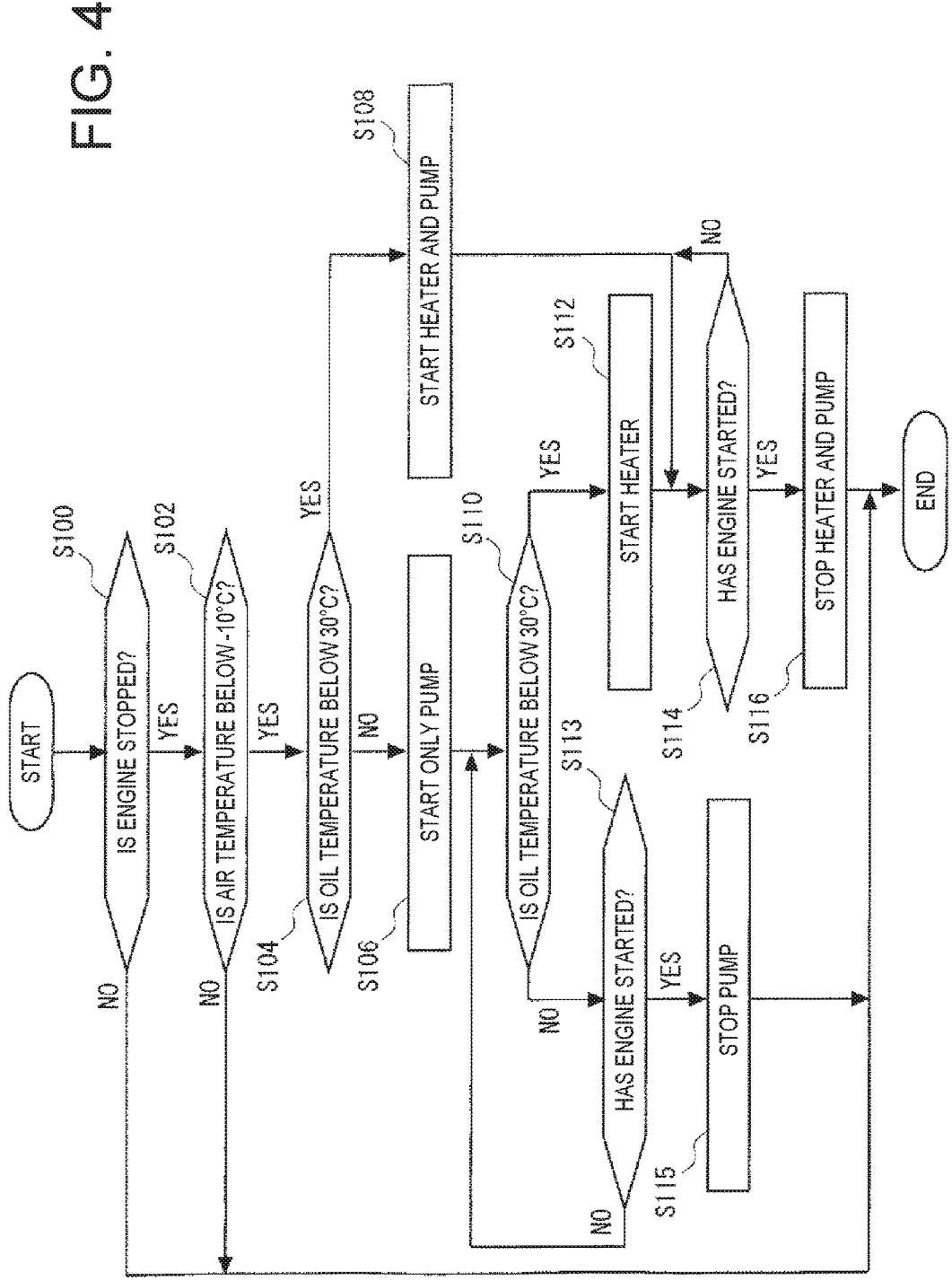
FIG. 4 is a flowchart that shows a flow of the preheating control using a preheating unit 67 related to the present invention.

FIG. 4 shows a flow of control with respect to the preheating unit 67 for the transmission 60 by this controller 90. First, this controller 90 determines whether or not the engine 70 is stopped in the first step S100, finishes the process when it is determined that the engine 70 is not stopped (NO), and shifts to the next step S102 when it is determined that the engine 70 is stopped (YES).

In the step S102, whether or not the outside temperature is below −10° C. is determined based on an input value from the temperature sensor, the process is finished as it is when it is determined not to be −10° C., namely −10° C. or above and there is no risk of a freeze of the transmission oil (NO), however, when it is determined that the outside temperature is below −10° C. and there is a risk of a freeze (YES), the process shifts to the next step S104. In the step S104, whether or not the temperature (oil temperature) of the transmission oil is below 30° C. is determined based on an input value from the oil temperature sensor, when it is determined to be below 30° C. (YES), the process shifts to the step S108, the heater 67*b* and the bypass pump 67*a* of the preheating unit 67 are started, and the transmission oil within the circulation channel 60A is drawn out from the upstream side of the lubrication pump 61 to the bypass pipe 66 side as shown in FIG. 2, is heated by the heater 67*b*, and is sent out to the downstream side of the lubrication pump 61.

At this time, in the lubrication pump 61 in suspension, since the flow of the transmission oil is stopped, the transmission oil having been sent out to the downstream side of the lubrication pump 61 does not flow to the lubrication pump 61 side but flows from the oil pipe 61*a* to the side of the flow divide-cum-relay block 62 and the flow divide block 63, passes through the respective narrow pipes 62*a*, 62*a* . . . , 63*a*, 63*a* . . . , the respective bearings B, B . . . and gears, and the respective narrow pipes 62*b*, 62*b* . . . , 63*b*, 63*b* . . . consecutively, thereafter flows out from the confluence blocks 64, 65 to the return oil pipes 64*a*, 65*a*, passes through the suction filters 64*b*, 65*b*, is drawn out to the bypass pipe 66, is heated again by the heater 67*b*, and comes to circulate within the circulation channel 60A as shown in FIG. 3. Thus, since the entire transmission 60 is kept warm at a proper temperature, even when the outside air temperature becomes an extremely cold state of −40° C. or below, for example, such problems that the transmission oil freezes and so on can be prevented.

On the other hand, when it is determined that the temperature (oil temperature) of the transmission oil is not below 30° C., namely, is 30° C. or above (NO) in the step S104 described above, the process shifts to the next step S106, only the bypass pump 67a of the preheating unit 67 is started, and the transmission oil within the circulation channel 60A is drawn out from the upstream side of the lubrication pump 61 to the bypass pipe 66 side and is sent out to the downstream side of the lubrication pump 61. Thus, the transmission oil whose oil temperature is 30° C. or above is circulated in the inside of the circulation channel 60A, the entire transmission 60 is kept at a proper temperature by the heat of the transmission oil itself, therefore wasteful heating by the heater 67b can be prevented, and electric power consumption can be suppressed.

In the next step S110, whether or not the oil temperature has become lower than 30° C. by drop of the outside air temperature and the like during circulation only by the lubrication pump 61 is determined, the process shifts to the step S113 when it is determined that the oil temperature has not become lower than 30° C. (NO), but when it is determined that the oil temperature has become lower than 30° C. (YES), the process shifts to the step S112, and the heater 67b of the electro-thermal type is started (energized). Thus, since the transmission oil having been drawn out to the bypass pipe 66 is heated and is made flow in the circulation channel 60A, a freeze of the transmission oil caused by drop of the oil temperature can be prevented more positively. Further, it is also possible to stop only this heater 67b when the oil temperature exceeds 30° C. to a large degree by heating of this heater 67b, and so on.

In the next step S114, whether or not the engine 70 has started is determined based on an input signal from the ECU and the like not illustrated. Circulation of the transmission oil is continued as it is when it is determined that the engine 70 has not started (NO), but when it is determined that the engine 70 has started (YES), the process shifts to the next step S116, the heater 67b and the bypass pump 67a are stopped, circulation and heating of the transmission oil by the preheating unit 67 are stopped, and the process is finished.

On the other hand, in a similar manner, in the step S113 described above also, whether or not the engine 70 has started is determined based on an input signal from the ECU and the like not illustrated, circulation of the transmission oil only by the bypass pump 67a is continued as it is when it is determined that the engine 70 has not started (NO), but when it is determined that the engine 70 has started (YES), the process shifts to the next step S115, the bypass pump 67a is stopped, thereby circulation of the transmission oil by the preheating unit 67 is stopped, and the process is finished. Thus, when circulation and heating of the transmission oil by the preheating unit 67 are finely controlled according to the change of the outside air temperature, the oil temperature, and the like which occurs while the engine 70 is stopped, efficient preheating processing can be effected while suppressing wasteful electric power consumption.

Moreover, by executing control similar to the above also in the other preheating units 77, 85, a freeze of the hydraulic oil and the cooling water can be efficiently prevented. In this case, when the starting temperature thereof is adjusted properly according to the freezing temperature of each oil kind, more efficient preheating processing can be effected. For example, in a case where the freezing temperature of the transmission oil and the cooling water is −10° C. and the freezing temperature of the hydraulic oil is −20° C., if preheating processing only by the preheating units 67 and 77 is executed when the outside air temperature becomes −10° C. and preheating processing by the preheating unit 85 on the hydraulic oil tank 80 side is further executed when the outside air temperature becomes −20° C., wasteful electric power consumption can be further suppressed.

As described above, in the present invention, even in a state the engine 70 stops and circulation of the fluid such as the transmission oil stops in the circulation channel 60A of the transmission 60 and so on, the fluid can be heated while being circulated in the same direction through the bypass pipe 66, and therefore the entire circulation channel 60A can be efficiently preheated. Moreover, since it has a construction that the bypass pipe 66 is branched with respect to the existing circulation channel 60A and the preheating unit 67 is attached to the bypass pipe 66, easy retrofitting to an existing construction machine is possible, and therefore sound versatility can be exerted. Further, as described above, when circulation and heating of the transmission oil by the preheating unit 67 are finely controlled according to the change of the outside air temperature, the oil temperature, and the like which occurs while the engine 70 is stopped, efficient preheating processing can be effected while suppressing wasteful electric power consumption.

Figure 5:
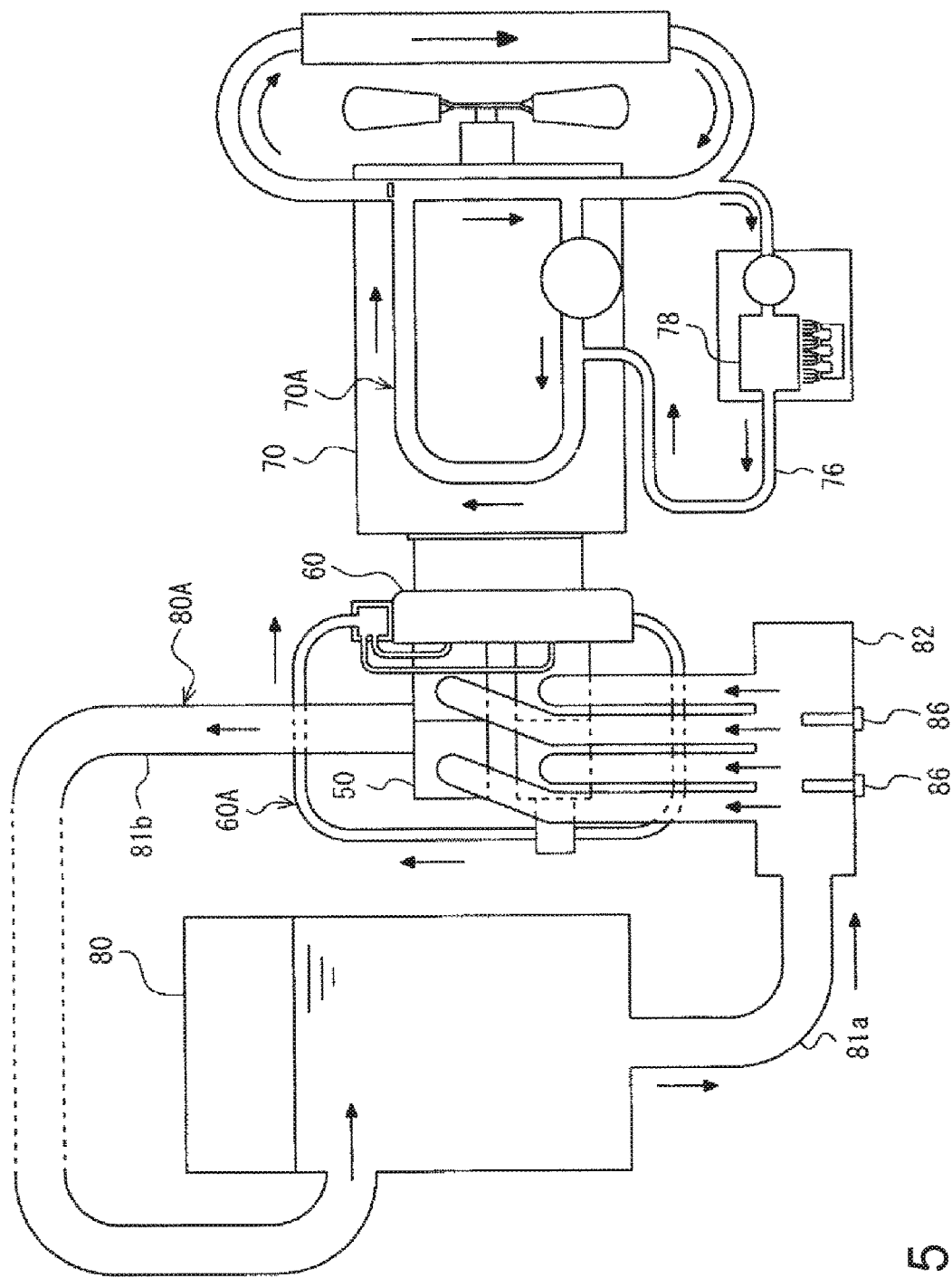
FIG. 5 is a schematic view that shows a configuration of the vicinity of a power train of a construction machine (hydraulic excavator) of a related art.

FIG. 5 shows a configuration example of a related art which does not include such preheating unit as that of the present invention. In other words, with respect to preheating of the cooling water of the engine 70, the bypass pipe 76 is provided in the circulation channel 70A similarly to the present invention, the cooling water is drawn out from the circulation channel 70A to the bypass pipe 76 side and is heated, however, since the heating means uses a heater 78 of a combustion type, sound combustion is hard in a place such as the highlands where the oxygen concentration is low, and the configuration thereof becomes complicated. Further, plural bar heaters 86, 86 are attached to the suction tank 82, are energized, and are intended to heat the hydraulic oil within the suction tank 82, however, with such configuration, the heating position is local, and it is hard to efficiently heat the entirety. Furthermore, in the transmission 60 in which seizure and the like caused by a freeze of the lubricating oil (transmission oil) should be prevented, the transmission 60 could not be efficiently preheated.

Moreover, although it was configured that the transmission 60 was driven by the engine 70 in the present embodiment, it is a matter of course that the present invention can be applied in a similar manner also to a case an electric motor is used as a prime mover instead of this engine 70.

REFERENCE SIGNS LIST

100 . . . Construction machine (hydraulic excavator)
50 . . . Main pump
60 . . . Transmission
60A, 70A, 80A . . . Circulation channel
61 . . . Lubrication pump
66, 76, 84 . . . Bypass pipe (channel)
67, 77, 85 . . . Preheating unit
67b, 77b, 84b . . . Electro-thermal type heater
67a, 77a, 84a . . . Bypass pump
70 . . . Engine (prime mover)
72 . . . Circulation pump
80 . . . Hydraulic oil tank 81a . . . Suction pipe
81b . . . Return pipe
82 . . . Suction tank
83 . . . Suction pipe
90 . . . Controller

The invention claimed is:

1. A construction machine, comprising:
a bypass channel in parallel with a circulation channel that circulates fluid; and
a preheating unit that consists of a heater and a bypass pump in the middle of bypass channel, wherein the construction machine further comprises a controller that is configured to:
(i) when an outside air temperature is lower than a first predetermined value T1 and a temperature of the fluid is lower than a second predetermined value T2 (where T1<T2) while a prime mover is stopped, control the preheating unit to execute heating of the fluid by the heater and fluid circulation by the bypass pump; and
(ii) when the outside air temperature is lower than the first predetermined value T1 and the temperature of the fluid is equal to or higher than the second predetermined value T2 while the prime mover is stopped, control the preheating unit to execute only fluid circulation by the bypass pump.

2. The construction machine according to claim 1, wherein the bypass channel is arranged between an upstream side and a downstream side of a circulation pump that is arranged in the circulation channel, and
the bypass pump of the preheating unit circulates the fluid in the direction same to that of the circulation pump of the circulation channel.

3. The construction machine according to claim 1, wherein the circulation channel is configured to circulate a lubricating oil between a hydraulic oil tank and a main pump,
the bypass channel is arranged in parallel with the circulation channel that is provided between the hydraulic oil tank and the main pump, and
the circulation channel and the bypass channel form a circulation loop of a hydraulic oil.

4. The construction machine according to claim 1, wherein the circulation channel is a circulation channel that circulates a transmission oil for a transmission.

5. The construction machine according to claim 1, wherein the circulation channel is a circulation channel that circulates cooling water for a prime mover.

6. The construction machine according to claim 3, wherein the bypass channel connects the hydraulic oil tank and a suction tank to each other.

7. A preheating method of a construction machine comprising
a bypass channel in parallel with a circulation channel that circulates fluid; and
a preheating unit that consists of a heater and a bypass pump in the middle of bypass channel, the method comprising:
measuring an outside air temperature and a temperature of the fluid when a prime mover is stopped;
executing heating of the fluid by the heater of the preheating unit and fluid circulation by the bypass pump when the outside air temperature is lower than a first predetermined value T1 and the temperature of the fluid is lower than a second predetermined value T2 (where T1<T2); and
executing only fluid circulation by the bypass pump of the preheating unit when the outside air temperature is lower than the first predetermined value T1 and the temperature of the fluid is equal to or higher than the second predetermined value T2.

* * * * *